United States Patent
Dinh

(10) Patent No.: US 6,742,284 B2
(45) Date of Patent: Jun. 1, 2004

(54) ENERGY EFFICIENT TOBACCO CURING AND DRYING SYSTEM WITH HEAT PIPE HEAT RECOVERY

(75) Inventor: Khanh Dinh, Gainesville, FL (US)

(73) Assignee: Advanced Dryer Systems, Inc., Alachua, FL (US)

( * ) Notice: Subject to any disclaimer, the term of this patent is extended or adjusted under 35 U.S.C. 154(b) by 0 days.

(21) Appl. No.: 10/041,255

(22) Filed: Jan. 8, 2002

(65) Prior Publication Data

US 2002/0088139 A1 Jul. 11, 2002

Related U.S. Application Data

(60) Provisional application No. 60/260,287, filed on Jan. 8, 2001.

(51) Int. Cl.[7] .................................................. F26B 3/32
(52) U.S. Cl. ............................. 34/514; 34/86; 34/515; 34/218; 165/909
(58) Field of Search ........................ 34/513, 514, 515, 34/86, 487, 169, 218, 219; 165/909, 921

(56) References Cited

U.S. PATENT DOCUMENTS

| | | | |
|---|---|---|---|
| 3,936,951 A | 2/1976 | Haueise et al. ................ 34/35 |
| 4,011,041 A | 3/1977 | Taylor ........................... 432/21 |
| 4,099,338 A | * 7/1978 | Mullin et al. ................. 34/514 |
| 4,114,288 A | * 9/1978 | Fowler ........................... 34/93 |
| 4,143,471 A | 3/1979 | Wochnowski et al. ......... 34/28 |
| 4,171,722 A | * 10/1979 | Huggins ..................... 55/385.1 |
| 4,218,832 A | 8/1980 | Daniels ........................... 34/79 |
| 4,240,581 A | 12/1980 | Fowler ....................... 237/12.1 |
| 4,247,991 A | 2/1981 | Mehta ............................. 34/35 |
| 4,263,721 A | 4/1981 | Danford ......................... 34/35 |
| 4,499,911 A | 2/1985 | Johnson ..................... 131/302 |
| 4,644,666 A | 2/1987 | Eberle et al. .................. 34/34 |
| 5,014,680 A | 5/1991 | Siemer ........................ 126/77 |
| 5,018,281 A | 5/1991 | Bulluck, Jr. ................... 34/35 |
| 5,119,571 A | 6/1992 | Beasley ........................ 34/26 |
| 5,237,757 A | 8/1993 | Wiedmann et al. ............ 34/35 |
| 5,343,632 A | 9/1994 | Dinh ........................... 34/507 |
| 5,685,710 A | 11/1997 | Martinez Sagrera et al. .......................... 432/500 |
| 5,845,702 A | 12/1998 | Dinh ..................... 165/104.21 |
| 5,921,315 A | 7/1999 | Dinh ..................... 165/104.21 |
| 6,068,874 A | 5/2000 | Grocholski ................ 426/465 |

* cited by examiner

Primary Examiner—Ira S. Lazarus
Assistant Examiner—Kathryn S. O'Malley
(74) Attorney, Agent, or Firm—Kinney & Lange, P.A.

(57) ABSTRACT

The invention is a drying system and a method for its use, the drying system having a container containing a product to be dried and a dryer. The dryer includes an inlet for providing the drying air, a drying air pathway, and a furnace for heating the drying air. The drying air flows through a supply route to the container, where the drying air dries the product and is converted into a return air. The return air flows through a return route back to the dryer. The return air flows through a return air pathway and a heat exchanger which intersects the return air pathway and the drying air pathway. The heat exchanger transfers heat from the return air to the drying air. The return air is exhausted through an outlet. In a preferred embodiment, the container is a tobacco barn and the product is tobacco.

20 Claims, 3 Drawing Sheets

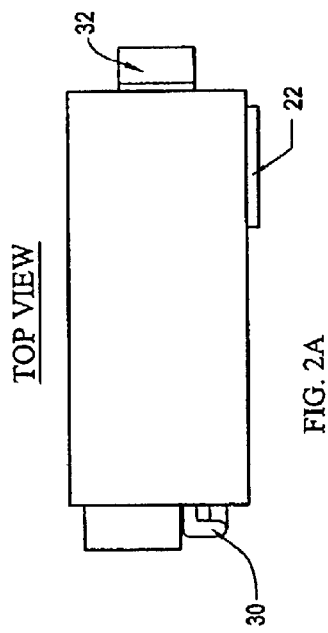
FIG. 2A TOP VIEW
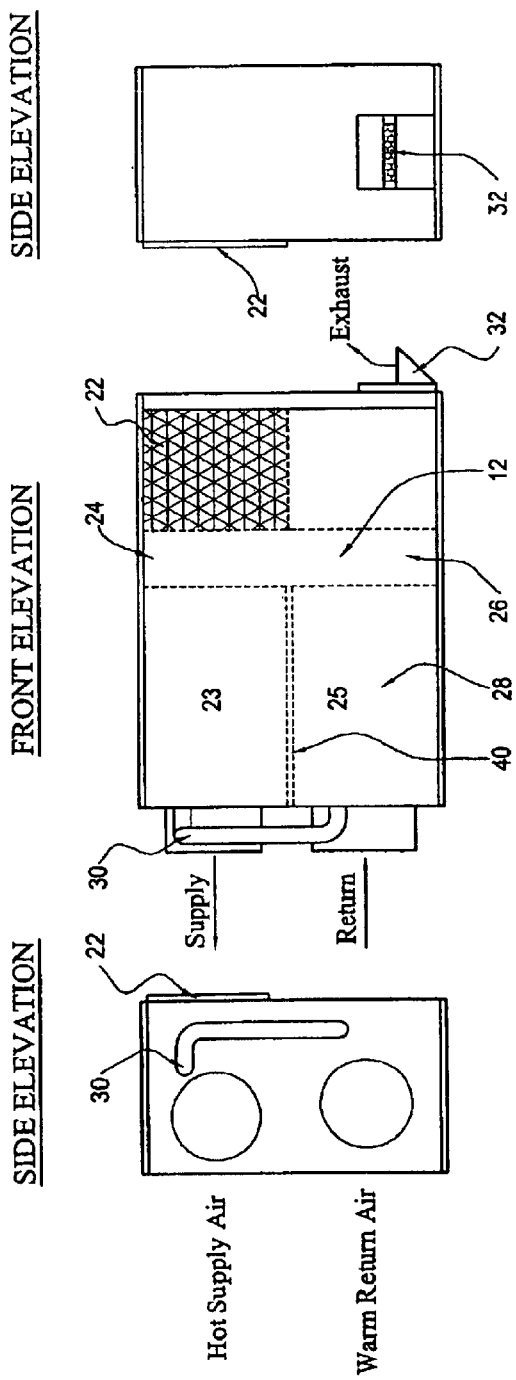
FIG. 2D SIDE ELEVATION
FIG. 2C FRONT ELEVATION
FIG. 2B SIDE ELEVATION

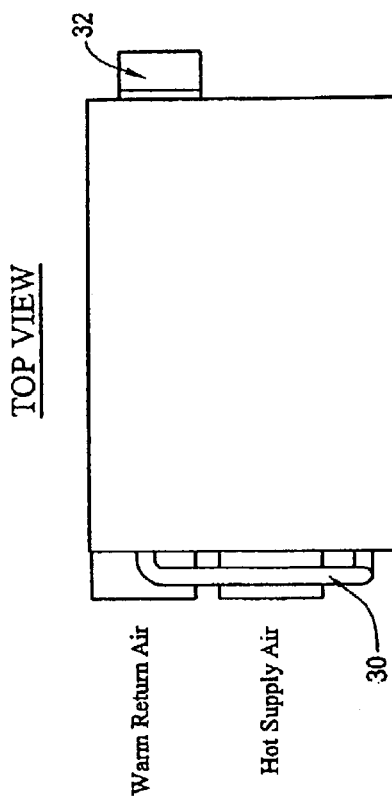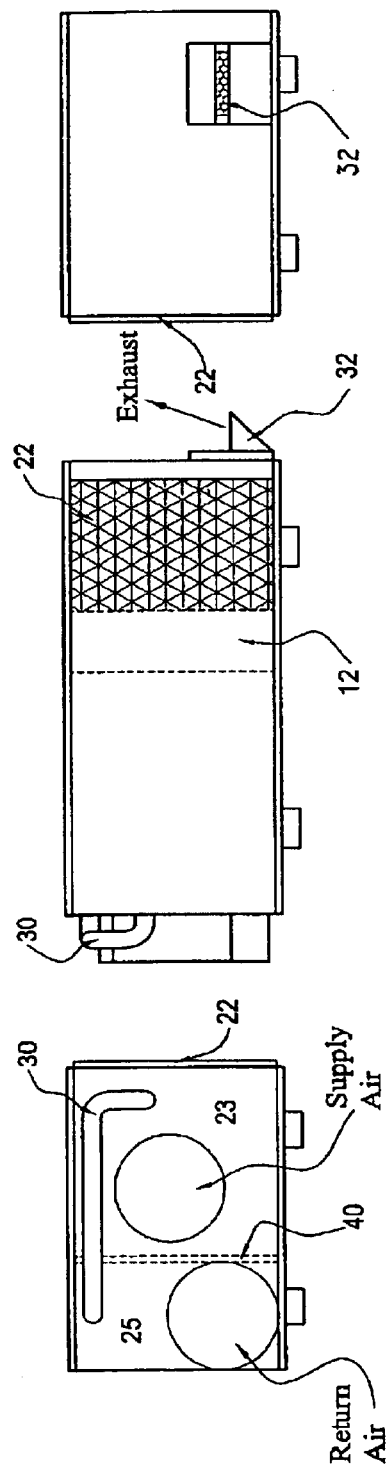

ENERGY EFFICIENT TOBACCO CURING AND DRYING SYSTEM WITH HEAT PIPE HEAT RECOVERY

CROSS-REFERENCE TO RELATED APPLICATION(S)

This application claims the priority benefits of U.S. Provisional Patent Application Serial No. 60/260,287, filed Jan. 8, 2001, for "Energy Efficient Tobacco Curing and Drying System with Heat Pipe Heat Recovery" by Khanh Dinh.

BACKGROUND OF THE INVENTION

The curing of bright-leaf (or flue-cured) tobacco is particularly energy intensive, due to the large amount of moisture which must be removed from the freshly harvested leaf. For example, to dry a typical tobacco barn containing 10,000 pounds of green tobacco leaves, one must remove as much as 8,500 pounds of water. Conventional tobacco curing methods are relatively inefficient, requiring an input of heat energy approximately three times that theoretically needed for vaporizing the moisture contained in the harvested leaf. The curing and drying of bright-leaf tobacco is conventionally carried out by the "bulk curing" method, in which tobacco leaves are loaded in a relatively compact mass in racks or in containers and placed inside of an enclosed curing barn, where a furnace circulates a forced flow of heated air through the tobacco leaves under prescribed conditions of temperature and humidity.

The curing process involves several distinct phases. Energy demand in the tobacco curing process differs at various phases during the curing cycle. The first phase, called yellowing, typically takes from about 36 to 72 hours. During this phase, energy demand is relatively low, with the air temperature from about 95° F. to about 105° F. and with high air recirculation and relatively high humidity. After yellowing, the drying phase begins, and energy demand increases significantly as the curing air temperature is gradually increased up to about 165° F. to about 170° F. with low humidity during most of the drying phase and reduced air recirculation. These conditions fix the color and promote drying of the tobacco leaves. The thin, leafy portions of the tobacco dries first, and the thicker stem portions dry later. The total drying phase, including leaf and stem drying, requires about 3 to 4 days. The final phase is conditioning of the tobacco. When the cure is complete, the tobacco is generally dry and brittle, and requires the addition of sufficient moisture to soften it enough to allow it to be handled for removal from the barn. The total time for processing one "batch" of tobacco is generally about 5 to 8 days, depending upon maturity of the freshly harvested leaf and other factors. Harvest of an entire crop generally occurs over a 5–7 week period, with successive batches of tobacco cured in the same barn.

In the past, tobacco was flue-cured: an open flame furnace was used to generate heat. A drawback of this system was that the resulting combustion gases were introduced, along with the hot air, into the barn containing the tobacco. These combustion gases can produce harmful compounds in the cured tobacco such as nitrosamines. Moreover, the hot air used to evaporate water from the tobacco leaves was usually exhausted. The exhaust air was still hot, and therefore large amounts of heat energy were wasted. Heat from exhaust air has typically not been recovered because the exhaust is undesirably wet, and conventional methods have not been able to separate the heat from the humidity.

Recently, heat exchangers have been added to prevent combustion gases from entering the barn, using an indirect firing system. However, most heat exchangers are only about 60 to 80 percent efficient at transferring heat from the furnace to the drying fluid, which is air in most cases. Thus, the technologies employing heat exchangers often contribute to even greater energy waste because the furnace must generate more heat than is actually used in the drying process. The need exists for a drying system which saves energy and allows for adjustments and control of the temperature, circulation, humidity of the drying air.

BRIEF SUMMARY OF THE INVENTION

The invention is a drying system and a method for its use, the drying system having a drying chamber or container containing a product to be dried and a dryer unit. The dryer includes an inlet for providing the drying air, a drying air pathway, and a heating source, typically a furnace, for heating the drying air. The drying air flows through a supply route to the container, where the drying air dries the product and is converted into a return air. The return air flows through a return route back to the dryer. The return air flows through a return air pathway and a heat exchanger which intersects the return air pathway and the drying air pathway. The heat exchanger transfers heat from the return air to the drying air. The return air is exhausted through an outlet. In a preferred embodiment, the drying chamber is a tobacco barn, the product is tobacco, and the heat exchanger is a heat recovery heat pipe.

BRIEF DESCRIPTION OF THE DRAWINGS

FIG. 2A is a mechanical drawing of a top view of a first embodiment of a dryer of the present invention.

FIG. 2B is a mechanical drawing of a side elevation view of a first embodiment of a dryer of the present invention.

FIG. 2C is a mechanical drawing of a front elevation view of a first embodiment of a dryer of the present invention.

FIG. 2D is a mechanical drawing of another side elevation view of a first embodiment of a dryer of the present invention.

FIG. 3A is a mechanical drawing of a top view of a second embodiment of a dryer of the present invention.

FIG. 3B is a mechanical drawing of a side elevation view of a second embodiment of a dryer of the present invention.

FIG. 3C is a mechanical drawing of a front elevation view of a second embodiment of a dryer of the present invention.

FIG. 3D is a mechanical drawing of another side elevation view of a second embodiment of a dryer of the present invention.

DETAILED DESCRIPTION

Figure 1:
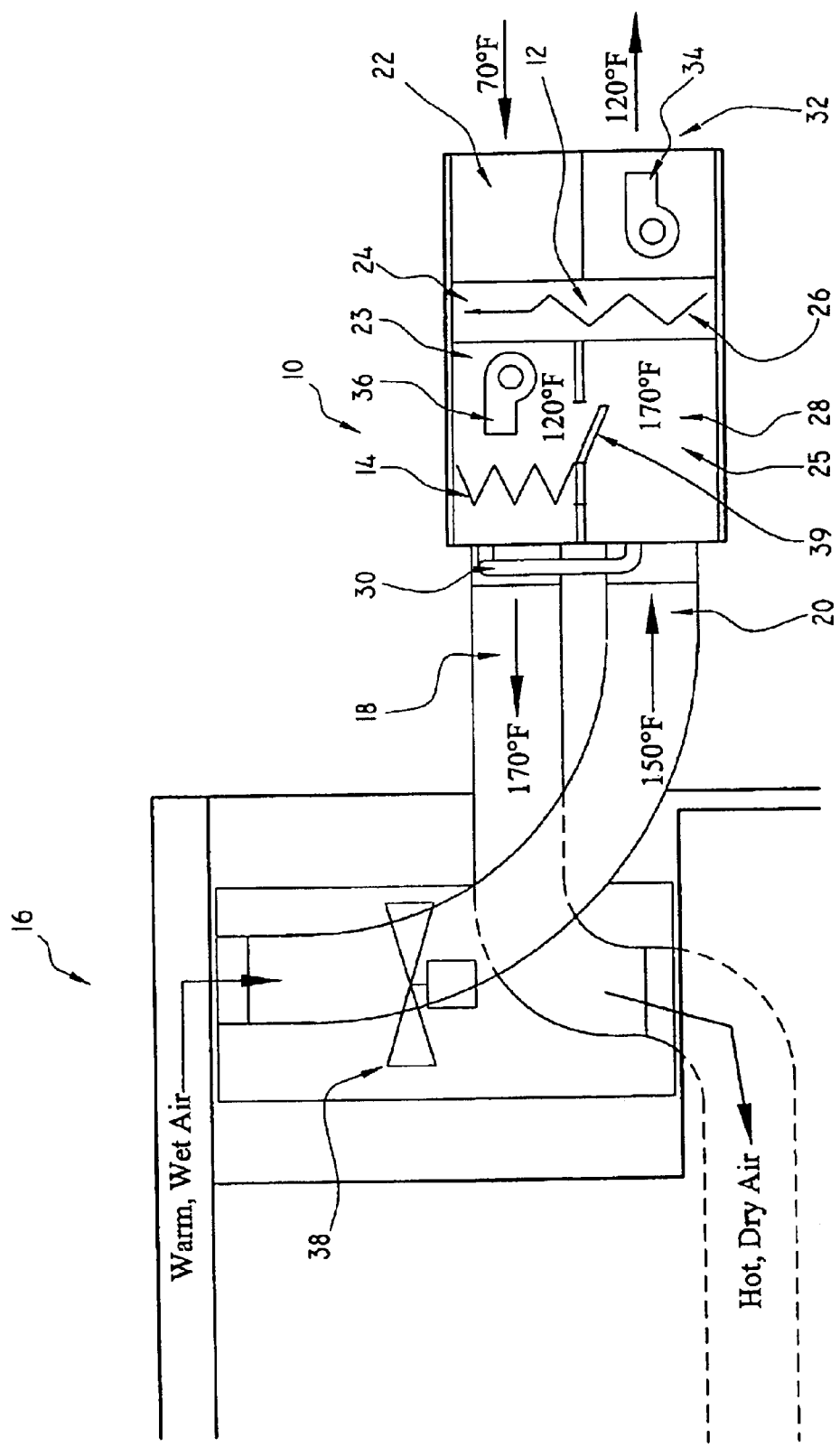
FIG. 1 is a schematic diagram of the principle of operation of the system of the present invention in an elevation view.

The present invention relates generally to a system and method for more economically and efficiently drying a moisture-containing material, and is particularly applicable to the curing and drying of tobacco. The present invention offers major innovations not known in the art. Unlike the prior art systems, the present invention uses a heat recovery heat pipe to recover heat from the exhaust air stream. This allows a smaller furnace to be used, thereby saving energy. Additionally, waste heat from the flue gas of a furnace having a heat exchanger is also recovered by the same heat recovery heat pipe, to provide for unprecedented energy efficiency. The heat recovery heat pipe recuperates as much as 70% of the heat normally lost, and at the same time provides complete isolation between the drying air and both the combustion gas-laden direct-heated air and the wet exhaust air. The present invention offers a more economical, as well as more healthy way to cure and dry tobacco. Although specifically designed for tobacco, it is contemplated that the principles taught herein can also be applied to dry other products, including a wide variety of agricultural and food products.

The increasing cost of fuel, as well as stricter requirements for preventing the flue gas from polluting the tobacco, have necessitated changes in tobacco drying systems. This invention is the first tobacco curing and drying system based on heat pipe technology, and it is also different from other heat recovery systems which only recover waste heat from the exhaust air, or from the flue gas, but not from a mixture of both.

The heat recovery heat pipe, with its high effectiveness, provides a new way to achieve unsurpassed energy efficiency. This invention using heat pipes is also compact and requires only minor changes to existing tobacco barns for a successful retrofit.

FIG. 1 is a schematic of the principle of operation of a preferred embodiment of the system of the present invention, in an elevation view. As shown in FIG. 1, tobacco dryer 10 using heat recovery heat pipe 12 is built around furnace 14 and connected to barn 16. Any furnace may be used, fueled by gas, oil, solar energy, or other energy sources. A preferred embodiment uses a 150,000 BTU indirect-fired gas furnace to dry about 10,000 to 12,000 pounds of green tobacco in a well-insulated, 21-foot barn. Furnace 14 may be equipped, as known in the art, with a conventional heat exchanger (not shown), such as a tubular or plate heat-exchanger. Because conventional heat exchangers are typically only about 80% efficient, waste heat from these heat exchangers is given off in flue gas exhausted from the furnace. FIG. 1 shows a retrofit application in which dryer or dryer unit 10 is connected by supply air duct 18 and return air duct 20 to existing tobacco barn 16. While dryer 10 is illustrated as connected to barn 16, it is contemplated that dryer 10 may be used with other drying chambers or containers for products to be dried, such as drying bins, lockers, buildings, and other units and structures. Because hot air rises compared to cooler air, a typical installation introduces hot supply air from dryer 10 at the bottom of barn 16 and retrieves cooler, moist return air near the top of barn 16. Air ducts 18 and 20 preferably comprise standard flexible duct tubing.

In operation, fresh air enters dryer 10 through inlet 22 and flows through drying air pathway 23 and the inlet or "cold" side 24 of heat recovery heat pipe 12, thereby gaining free heat which is transferred from the exhaust or "hot" side 26 of heat recovery heat pipe 12. Dryer 10 is sized so that the inlet air stream is sufficient to supply the necessary heat to barn 16, and so that the exhaust air stream is sufficient to remove the moisture generated by the drying process. Such sizing is dependent on the size and capacity of barn 16, among other factors. Excess airflow will result in wasted energy.

After preheating by passing through heat pipe 12, the inlet air is then further heated by furnace 14 to the desired temperature. This heated air then flows, through a supply route, in this case air duct 18, to tobacco barn 16. The heated air then flows upward through barn 16 to dry the tobacco therein. As the air flows through the tobacco, thereby drying it, it is converted from a drying air to a return air. After traveling through the tobacco, the air, now warm and wet, flows through a return route, in this case return air duct 20, back to dryer 10. The air flows through return air pathway 25 to pass through exhaust side 26 of heat pipe 12 and out of dryer 10 through exhaust outlet 32.

Alternatively, instead of ducts 18 and 20, drying air pathway 23 and return air pathway 25 may be connected to drying chamber 16 by any suitable routes. For example, dryer 10 may be built around drying chamber 16 rather than separately therefrom.

The heat exchanger, in this case heat pipe 12, is positioned to intersect drying air pathway 23 and return air pathway 25. The heat exchanger may be of any type that actively transfers heat from return air pathway 25 to drying air pathway. Examples of such active heat exchangers are desiccant wheels and heat pumps. In an alternative embodiment, a desiccant wheel, which is known in the art, may be substituted for heat pipe 12. A desiccant wheel is a wheel with holes therein, impregnated with desiccant material which absorbs moisture. The desiccant wheel is positioned to intersect drying air pathway 23 and return air pathway 25. The part of the wheel in drying air pathway 23 absorbs the moisture in the air coming into dryer 10 through inlet 22. As the wheel rotates, that portion of the wheel then rotates into return air pathway 25. The heat from the air in return air pathway 25 serves to regenerate the desiccant wheel by evaporating the moisture therefrom. While in return air pathway 25, the wheel also picks up heat from the return air and flue gas. As the wheel continues to rotate, that heat is given up in drying air pathway 23. Thus, the wheel serves to actively transfer heat from return air pathway 25 to drying air pathway 23, as well as dehumidify the incoming air.

As another example, a vapor compression heat pump, as known in the art, can be substituted for heat pipe 12 to transfer heat from return air pathway 25 to drying air pathway 23. A heat pump comprises a compressor intermediate an evaporator and a condenser. In this case, the evaporator section of the heat pump is placed in return air pathway 25 and the condenser section of the heat pump is placed in drying air pathway 23. The evaporator section absorbs heat from return air pathway 25, thereby expanding a refrigerant, such as Freon, into vapor. The vapor flows to a compressor of the heat pump, which compresses the vapor. This compressed vapor is routed to the condenser, where it condenses into liquid and gives off the heat produced by the phase change into drying air pathway 23. It is apparent that dryer unit 10 may utilize any known heat exchanger to actively transfer heat from return air pathway 25 to drying air pathway 23.

These active heat exchangers are contrasted with passive heat exchangers, such as well known counterflow heat exchangers which rely merely on the surface area between two air flow paths to transfer heat from one path to another. The heat exchangers used in the present invention intersect the air paths to absorb heat from a first air path, transfer the heat to a second air path, and release the heat in the second air path.

Furnace 14 is preferably equipped with another heat exchanger to prevent the introduction of dangerous combustion products into tobacco barn 16. However, the heat exchanger is generally only about 60 to 80 percent efficient in transferring heat from furnace 14 to the drying air. As a result, the flue gas, which is emitted from furnace 14 and carries away the combustion products, also carries away a great amount of heat. In prior art systems, this heat energy was lost.

In the present invention, the flue gas travels from furnace 14, via flue gas pathway 30, to mixing plenum 28. Flue gas pathway 30 preferably comprises an insulated pipe, but may be any other passage means. In plenum 28, the flue gas mixes with the return air from barn 16. The hot and wet mix of return air and flue gas is now moved through exhaust side 26 of heat exchanger 12 and exhausted through outlet 32 to the outside. As the mixture of return air and flue gas travels through heat recovery heat pipe 12, heat from the air and gas mixture is transferred by heat recovery heat pipe 12 from exhaust side 26 to inlet side 24. This recovery of the heat of the flue gas is possible because the configuration of the system is such that the dangerous combustion products of the flue gas never enter supply duct 18.

Alternatively, the flue gas and the return air may each pass through heat pipe 12 without first mixing in plenum 28. Moreover, the system may be designed so that the flue gas alone is passed through return air pathway 25 and exhaust side 26 of heat pipe 12. In that case, the moist return air from barn 16 may simply be exhausted to the atmosphere rather than returned to dryer 10. In all cases, the fresh air entering inlet 22 is preferably taken from a location away from outlet 32 so that no pollution is fed back into the process air stream.

Blowers are preferably placed strategically in dryer 10 and tobacco barn 16 to achieve the desired rate of air flow through the system. In a preferred embodiment, they may be located as shown by blowers 34, 36, and 38. Blower 34 directs air from return air pathway 25 through outlet 32. Blower 36 directs air from drying air pathway 23 to barn 16. In one embodiment, blowers 34 and 36 are rated at approximately 1 horsepower each. Barn 16 is usually already equipped with blower 38, which generally circulates air through barn 16. Blowers 34, 36, and 38 may be of any type suitable for circulating air; in a preferred embodiment, centrifugal blowers are used. Blowers 34, 36, and 38 are preferably controllable to vary the flow of air through the system. It is believed that during some stages of the drying process, the amount of oxygen inside barn 16 is depleted, thereby allowing for anaerobic organism activity. These organisms react with tobacco nitrates to form nitrosamines, substances known to cause cancer. Properly controlled air circulation can provide adequate oxygen to reduce this activity and consequently reduce the concentration of carcinogens in finished tobacco products. The air circulation can also be controlled to minimize fuel usage.

A retrofit of dryer 10 for use with existing barn 16 is a simple process. Barn 16 is usually equipped with blower unit 38. In a preferred embodiment, a hole in blower unit 38 may be cut to accommodate supply air duct 18. Air duct 18 is fit into blower unit 38 to direct hot drying air from dryer 10 into the bottom of barn 16. The drying air is circulated through barn 16 and the tobacco therein by blowers 36 and 38. A hole in blower unit 38 is also cut to accommodate return air duct 20. Air duct 20 is fit into blower unit 38 to direct warm and moist return air from the top of barn 16 back to dryer 10. It will be understood by those skilled in the art that other installation procedures and configurations may be used.

Dryer 10 may also include bypass door 39, which is operable to be opened and closed as desired. When door 39 is open, mixing between the air in drying air pathway 23 and the air in return air pathway 25 may occur. Door 39 may be opened, for example, during times when it is desirable to have higher humidity in the drying air. Bypass door 39 may be of any configuration which allows for controlled passage of air between drying air pathway 23 and return air pathway 25, and may be controlled manually, electronically, or by other means known in the art.

A numerical example will better explain the process of the invention. The air flow rates, temperatures, and other specifics shown are illustrative only, and departures therefrom, depending on the requirements of the products to be dried and other considerations, are specifically contemplated.

For this example, dryer 10 is operating at an air flow rate of about 2000–2500 CFM (cubic feet per minute), with an ambient air temperature of 70° F. and a desired drying temperature of 170° F. Fresh air flows into dryer 10 through inlet 22. It is preheated to 120° F. as it passes through inlet side 24 of heat recovery heat pipe 12. It is further heated by furnace 14 to 170° F. The hot drying air flows through supply air duct 18 to barn 16. The air flows through the tobacco in barn 16, evaporating moisture from the tobacco. As the drying air travels through the tobacco, it drops in temperature to about 150° F. At 150° F., the air is returned to dryer 10 through return air duct 20.

In mixing plenum 28, the return air is mixed with flue gas at typically 300° F.–400° F. from furnace 14. The mixture now is about 170° F. when entering the exhaust side 26 of heat recovery heat pipe 12, depending on the proportion of return air to flue gas. Heat pipe 12, for this example, is assumed to have an effectiveness of 50%, which is easily achievable with heat pipes. Since the ambient air is at 70° F., there is a difference of temperature of 100° F., of which 50° F. will be transferred by the heat recovery heat pipe 12 to inlet side 24 of heat pipe 12. Thus, the outgoing air loses 50° F. and is exhausted at 120° F. As a result, the incoming air is heated with the transferred 50° F. from 70° F. ambient to 120° F. after flowing through heat recovery heat pipe 12. This air then enters furnace 14, where it is heated further to 170° F. Heat recovery heat pipe 12 therefore provides 50° F. of free heat, and furnace 14 provides 50° F. of heat from burning fuel. A savings of 50% is realized on the energy otherwise needed to heat ambient air from 70° F. to 170° F. Assuming an air flow rate of 2000 CFM, the amount of energy necessary to create a 50° F. temperature increase can be calculated by the following formula:

energy=air flow mass×temperature difference×specific heat of air

The calculations show that approximately 110,000 BTU are required from the furnace in the case of air being pre-heated by the heat pipe, and 220,000 BTU are required in the case of a conventional furnace without the heat pipe. The saving of energy is therefore 50%.

Dryer 10 may be adjusted as needed to cure and dry the contents of barn 16 according to the specific temperature, humidity, and air circulation needs of the contents, taking into account the amount of tobacco to be dried; the maturity, variety, and arrangement of the leaves; the stage of curing involved; ambient climatic conditions; and other factors. To regulate these parameters, an operator may adjust the temperature setting of furnace 14; the air flow setting of blowers 34, 36, or 38; and the extent of opening of door 39 to reach the desired balance of conditions. These adjustments maybe accomplished manually, or automated by the use of sensors and controllers known in the art, such as temperature sensors, humidity sensors, and enthalpy sensors. The parameters may be set to minimize energy use, minimize drying times, obtain a dried product with particular characteristics, or achieve other objectives. Additionally, the operator may add moisture to barn 16 as needed by means known in the art, such as by spraying, misting, steaming, or otherwise injecting water. Conversely, the operator may dehumidify the incoming air with a separate dehumidifier before the air is fed to dryer 10 through inlet 22. Use of a dehumidifier can shorten drying times and further reduce fuel consumption. Shortened drying times are desirable because they increase the yield of each barn and allow a crop to be dried using fewer barns.

The principle illustrated in FIG. 1 may be applied in apparatuses of varying configuration, as can be appreciated by one of ordinary skill in the art. This flexibility is valuable especially where dryer 10 is to be retrofitted to an existing tobacco barn 16. While the physical pathways of air vary according to the structure of dryer 10, the operation of dryer 10 nonetheless follows the described principles. FIGS. 2A–2D show one possible embodiment of dryer 10, wherein drying air pathway 23 and return air pathway 25 are vertically displaced with respect to each other. This configuration, described in FIG. 1 and shown in FIGS. 2A–2D, allows for the use of an inexpensive and very efficient gravity heat pipe, such as that described in U.S. Pat. No. 5,845,702 to Dinh, which is hereby incorporated by reference. Multiple units are easily combined for increased drying capacity.

In FIGS. 2A–2D, like parts are given like numbers, as compared to FIG. 1. As shown in FIGS. 2A–2D, dryer 10 comprises a generally rectangular box with 4 vertical walls. Inlet 22 and outlet 32 are disposed on different walls of dryer 10 to minimize the amount of exhaust gas that may be taken into dryer 10 as fresh air. Inlet 22 and outlet 32 may be covered with a grate or screen to prevent the introduction of leaves, insects, and other contamination into dryer 10. Insulated or double wall 40 may be disposed between drying air pathway 23 and return air pathway 25 to prevent heat loss from the supply air to the return air. The operation of dryer 10 was described with reference to FIG. 1.

FIGS. 3A–3D show another possible embodiment of dryer 10, wherein drying air pathway 23 and return air pathway 25 are horizontally displaced with respect to each other. Like parts are given like numbers, as compared to FIG. 1. This configuration positions the supply air stream and the return air stream side by side, and a heat pipe which does not require gravity to operate is needed. Such a heat pipe is the 3D heat pipe, the subject of U.S. Pat. No. 5,921,315 to Dinh, which is hereby incorporated by reference. The side by side configuration of this embodiment offers the flexibility for several units to be stacked one on top of the other to provide increased drying. Dryer 10 as depicted in FIGS. 3A–3D also operates as described with reference to FIG. 1, though the physical path of air flow depends on the particular structural construction of dryer 10.

As shown in FIGS. 3A–3D, drying air pathway 23 has a larger cross sectional area than return air pathway 25. Because the same volume of air flows through both pathways 23 and 25, air flow in return air pathway 25 will have a higher velocity. Thus, any leaks in the system will flow out through outlet 32. This configuration prevents contaminated combustion fumes from entering barn 16.

Although the present invention has been described with reference to preferred embodiments, workers skilled in the art will recognize that changes may be made in form and detail without departing from the spirit and scope of the invention. For example, dryer 10 may be configured as shown in FIGS. 2A–2D, FIGS. 3A–3D, or in any other configuration obvious to those skilled in the art.

What is claimed is:

1. A drying system comprising:

a drying chamber wherein a drying air is converted into a return air;

a dryer comprising:
   an inlet for providing the drying air;
   a drying air pathway through which the drying air flows;
   a return air pathway through which the return air flows;
   a heat recovery heat pipe intersecting the drying air pathway and the return air pathway, wherein the heat recovery heat pipe actively transfers heat from the return air to the drying air;
   a heat source for heating the drying air, wherein the heat source comprises a furnace that emits a flue gas, the system further comprising:
      a flue gas pathway connecting the furnace and the return air pathway;
      the system wherein the heat pipe transfers heat from the flue gas to the drying air; and
   an outlet for exhausting the return air;
a supply route for connecting the drying air pathway to the drying chamber; and
a return route for connecting the drying chamber to the return air pathway.

2. The drying system of claim 1 further comprising:
a first blower which directs air from the drying air pathway to the drying chamber.

3. The drying system of claim 2 further comprising:
a second blower which directs air from the return air pathway through the outlet;
wherein the first and second blowers are each controllable to vary a flow of air through the system.

4. The drying system of claim 1 further comprising:
one or more sensors selected from the group consisting of temperature sensors, humidity sensors, and enthalpy sensors.

5. The drying system of claim 4, wherein the heat source is controlled by a temperature sensor.

6. The drying system of claim 1 wherein the dryer comprises a generally rectangular box with four vertical exterior walls, and wherein the inlet and the outlet are disposed on different walls.

7. The drying system of claim 1 further comprising:
a dehumidifier for removing moisture from the drying air before the drying air is introduced into the dryer through the inlet.

8. A drying system comprising:
a drying chamber wherein a drying air is converted into a return air;
a dryer comprising:
   an inlet for providing the drying air;
   a drying air pathway through which the drying air flows;
   a heating source for heating the drying air;
   a return air pathway through which the return air flows;
   a heat recovery heat pipe intersecting the drying air pathway and the return air pathway, wherein the heat recovery heat pipe actively transfers heat from the return air to the drying air;
   a wall separating the drying air pathway and the return air pathway;
   a door in the wall, the door being operable to allow for mixing of the air in the return air pathway into the air of the drying air pathway; and
   an outlet for exhausting the return air;
a supply route for connecting the drying air pathway to the drying chamber;
a return route for connecting the drying chamber to the return air pathway.

9. A drying system comprising:

a drying chamber wherein a drying air is converted into a return air;

a dryer comprising:
　an inlet for providing the drying air;
　a drying air pathway through which the drying air flows;
　a return air pathway through which the return air flows;
　a desiccant wheel intersecting the drying air pathway and the return air pathway, wherein the desiccant wheel actively transfers heat from the return air to the drying air;
　a heat source for heating the drying air, wherein the heat source comprises a furnace that emits a flue gas, the system further comprising:
　　a flue gas pathway connecting the furnace and the return air pathway;
　　the system wherein the desiccant wheel transfers heat from the flue gas to the drying air; and
　an outlet for exhausting the return air;

a supply route for connecting the drying air pathway to the drying chamber; and a return route for connecting the drying chamber to the return air pathway.

10. The drying system of claim 9 further comprising:
a first blower which directs air from the drying air pathway to the drying chamber.

11. The drying system of claim 9 further comprising:
a second blower which directs air from the return air pathway through the outlet;
wherein the first and second blowers are each controllable to vary a flow of air through the system.

12. A drying system comprising:

a drying chamber wherein a drying air is converted into a return air;

a dryer comprising:
　an inlet for providing the divine air;
　a drying air pathway through which the drying air flows;
　a return air pathway through which the return air flows;
　a vapor compression heat pump intersecting the drying air pathway and the return air pathway, wherein the vapor compression heat pump actively transfers heat from the return air to the drying air;
　a heat source for heating the drying air, wherein the heat source comprises a furnace that emits a flue gas, the system further comprising:
　　a flue gas pathway connecting the furnace and the return air pathway;
　　the system wherein the vapor compression heat pump transfers heat from the flue gas to the drying air; and
　an outlet for exhausting the return air;

a supply route for connecting the drying air pathway to the drying chamber; and a return route for connecting the drying chamber to the return air pathway.

13. The drying system of claim 12 further comprising:
a first blower which directs air from the drying air pathway to the drying chamber.

14. The drying system of claim 12 further comprising:
a second blower which directs air from the return air pathway through the outlet;
wherein the first and second blowers are each controllable to vary a flow of air through the system.

15. A dryer comprising:
an inlet for providing a drying air;
a drying air pathway through which the drying air flows;
a furnace for heating the drying air, wherein the furnace emits a flue gas;
a return air pathway through which a return air flows;
a heat recovery heat pipe intersecting the drying air pathway and the return air pathway, wherein the heat pipe transfers heat from the return air to the drying air;
an outlet for exhausting the return air; and
a flue gas pathway connecting the furnace and the return air pathway;
the dryer wherein the heat pipe transfers heat from the flue gas to the drying air.

16. The dryer of claim 15 further comprising:
a wall separating the drying air pathway and the return air pathway; and
a door in the wall, the door being operable to allow for mixing between the drying air, the flue gas, and the return air.

17. A method of drying a product, the method comprising:
providing a drying air;
directing the drying air through a heat recovery heat pipe, thereby raising the temperature of the drying air;
further heating the drying air with a furnace, wherein the furnace emits a flue gas;
directing the flue gas from the furnace through the heat pipe, thereby lowering a temperature of the flue gas;
exhausting the flue gas;
directing the drying air through the product, whereby the drying air is converted into a return air;
directing the return air through the heat pipe, thereby lowering the temperature of the return air, and
exhausting the return air.

18. The method of claim 17 wherein the dryer comprises a mixing plenum, the method further comprising:
mixing the flue gas with the return air in the mixing plenum to form a mixed air;
directing the mixed air through the heat pipe, thereby lowering a temperature of the mixed air; and
exhausting the mixed air.

19. The method of claim 17 further comprising:
dehumidifying the drying air.

20. A method of drying a product, the method comprising:
providing a drying air;
directing the drying air through a heat recovery heat pipe, thereby raising the temperature of the drying air;
further heating the drying air with a furnace, wherein the furnace emits a flue gas;
directing the drying air through the product;
directing the flue gas through the heat pipe, thereby lowering the temperature of the flue gas; and
exhausting the flue gas.

* * * * *